(12) United States Patent
Kiribuchi

(10) Patent No.: US 12,300,995 B2
(45) Date of Patent: May 13, 2025

(54) METHOD OF POWER TRANSMISSION

(71) Applicant: OMRON Corporation, Kyoto (JP)

(72) Inventor: Takeshi Kiribuchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 169 days.

(21) Appl. No.: 18/161,128

(22) Filed: Jan. 30, 2023

(65) Prior Publication Data
US 2023/0261464 A1     Aug. 17, 2023

(30) Foreign Application Priority Data
Feb. 15, 2022 (JP) ................................. 2022-021135

(51) Int. Cl.
*H02P 5/74* (2006.01)
*H02J 1/10* (2006.01)

(52) U.S. Cl.
CPC .............. *H02J 1/102* (2013.01); *H02J 1/106* (2020.01); *H02P 5/74* (2013.01)

(58) Field of Classification Search
CPC .............. H02J 1/102; H02J 1/106; H02P 5/74
See application file for complete search history.

(56) References Cited

U.S. PATENT DOCUMENTS 9,660,444 B2 * 5/2017 Kanada .................... H02P 23/20
10,439,600 B1 10/2019 Eggermont
11,734,213 B2 * 8/2023 Nixon ................... H04L 67/125
                                                                                        710/5
2005/0197017 A1 9/2005 Chou et al.
2008/0103630 A1 5/2008 Eckroad
(Continued)

FOREIGN PATENT DOCUMENTS

JP       H05115173 A    5/1993
JP       2000153573 A   6/2000
(Continued)

OTHER PUBLICATIONS

Office Action issued in U.S. Appl. No. 18/161,156, mailed on Feb. 29, 2024.
(Continued)

*Primary Examiner* — Thai T Dinh
(74) *Attorney, Agent, or Firm* — ROSSI, KIMMS & McDOWELL LLP

(57) ABSTRACT

A signal for supplying power and a signal for transmitting information are transmitted suitably. A method for transmitting a signal to a power transmission path includes: a first step of disposing a first power transmission path and a second power transmission path; a second step of attaching a predetermined process device, being detachable, between the first power transmission path and the second power transmission path such that an input terminal of the predetermined process device is in contact with the first power transmission path and that an output terminal of the predetermined process device is in contact with the second power transmission path; and a third step of supplying an input signal to the first power transmission path and outputting, to the second power transmission path, an output signal obtained by performing a predetermined process on the input signal by the predetermined process device.

7 Claims, 9 Drawing Sheets

(56) References Cited

U.S. PATENT DOCUMENTS

| | | | | |
|---|---|---|---|---|
| 2014/0292231 A1* | 10/2014 | Kanada | ................... | H02J 1/10 |
| | | | | 318/440 |
| 2015/0372499 A1* | 12/2015 | Purcarea | ................... | H02J 7/02 |
| | | | | 307/104 |
| 2016/0181749 A1 | 6/2016 | Rathjen et al. | | |
| 2016/0322828 A1* | 11/2016 | Vogel | ................... | H02M 3/285 |
| 2018/0069268 A1 | 3/2018 | Nakamura et al. | | |
| 2019/0157864 A1 | 5/2019 | Karino | | |
| 2021/0081346 A1* | 3/2021 | Nixon | ................... | H04L 67/125 |
| 2022/0361353 A1 | 11/2022 | Lohan et al. | | |

FOREIGN PATENT DOCUMENTS

| | | |
|---|---|---|
| JP | 2005184912 A | 7/2005 |
| JP | 2017184398 A | 10/2017 |
| JP | 2018107847 A | 7/2018 |
| KR | 100975482 B1 | 8/2010 |
| KR | 2020120000747 U | 2/2012 |
| KR | 1020190036696 A | 4/2019 |
| WO | 2018021534 A1 | 2/2018 |

OTHER PUBLICATIONS

Office Action issued in Korean Appln. No. 10-2023-0010080 mailed on Apr. 20, 2024. English translation attached.

Copending U.S. Appl. No. 18/161,156, filed Jan. 30, 2023 (a copy is not included because the cited application is not yet available to the public and the Examiner has ready access to the cited application).

Office Action issued in U.S. Appl. No. 18/161,156 mailed Sep. 24, 2024.

Notice of Preliminary Rejection issued in Korean Patent Application No. 10-2023-0010073 mailed Aug. 1, 2024. English translation provided.

Notice of Last Preliminary Rejection issued in Korean Application No. 10-2023-0010080 mailed Dec. 7, 2024. English translation provided.

* cited by examiner

METHOD OF POWER TRANSMISSION

CROSS-REFERENCE TO RELATED APPLICATION

This application is based on Japanese Patent Application No. 2022-021135 filed with the Japan Patent Office on Feb. 15, 2022, the entire contents of which are incorporated herein by reference.

FIELD

The present invention relates to a power transmission method for transmitting a signal to a power transmission path.

BACKGROUND

For power transmission of a signal in a power transmission path, many methods of power transmission have been developed depending on what type of signal the signal is. For example, in the case of transmitting a signal related to power, WO 2018/021534 discloses a technique for smoothing an output current in a power transmission path as much as possible. Further, Japanese Unexamined Patent Publication No. 5-115173 discloses a technique for suitably adjusting an output voltage of a signal in a power transmission path. Moreover, Japanese Unexamined Patent Publication No. 2017-184398 discloses a technique for easily changing the configuration of a system for power transmission.

In the power transmission of the signal in the power transmission path, for example, from a viewpoint of safety such as electric shock prevention, a viewpoint of signal quality such as prevention of superimposition of noise on the signal, and the like, various improvements are often made in the transmission lines. On the other hand, the degree of freedom in the formation of the power transmission path may be limited when such an improvement is attempted in the power transmission of the signal. When the degree of freedom in forming the power transmission path is limited, the size and length of the power transmission path may become excessively large, and as a result, the situation will not necessarily be favorable in terms of safety and signal quality.

SUMMARY

The present invention has been made in view of these problems, and it is an object of the present invention to provide a technique for suitably transmitting a signal for supplying electric power and a signal for transmitting information.

A power transmission method according to one aspect of the present disclosure is a method for transmitting a signal to a power transmission path, the method including: a first step of disposing a first power transmission path and a second power transmission path; a second step of attaching a predetermined process device, being detachable, between the first power transmission path and the second power transmission path such that an input terminal of the predetermined process device is in contact with the first power transmission path and that an output terminal of the predetermined process device is in contact with the second power transmission path; and a third step of supplying an input signal to the first power transmission path and outputting, to the second power transmission path, an output signal obtained by performing a predetermined process on the input signal by the predetermined process device.

The power transmission method is a method for transmitting an arbitrary signal to a power transmission path. The signal is not limited to a signal of a specific form, and examples thereof include a signal for supplying power and a signal for transmitting information. The power transmission method enables suitable power transmission of the signal in the power transmission path based on physical characteristics of the signal, such as voltage, frequency, and power amount. In the first step, the first power transmission path and the second power transmission path through which the signal is transmitted are disposed, but the form of the first power transmission path and the second power transmission path is not limited to a specific form, and various forms can be employed as long as the predetermined process device can be attached in the second step.

For example, in the first step, a plurality of bus components may be prepared, the bus components each including a base member, and a first energization path and a second energization path that are formed to extend from one edge to the other edge of a set of opposing edges of the base member. An edge of one of the bus components may be brought into contact with an edge of another of the bus components to couple both of the bus components to each other, and the first energization path and the second energization path in one of the bus components and the first energization path and the second energization path in another of the bus components may be connected to form the first power transmission path and the second power transmission path.

The bus component includes a base member, and at least two types of energization paths of a first energization path and a second energization path. The energization path forms a part of a power transmission path through which a signal is finally transmitted. It is preferable that the base member be basically formed of an insulating member so as to realize transmission of a signal in each energization path. The base member is not limited to a specific shape, but when each energization path included in the base member is used as a reference, the base member has a set of edges made up of one edge including one end of each energization path and the other edge including the other end of each energization path. The set of edges may be located on the same plane or may be located on different planes. For example, in a case where the set of edges of the base member are located on the same plane, the shape of the plane may be a polygonal shape including a quadrangle, or alternatively, the set of edges may be formed in a curved shape. Also, the set of edges need not necessarily be parallel. In a case where one set of edges are located on different planes in the base member, a form can be exemplified in which the base member is three-dimensionally formed, and one end and the other end of each energization path are exposed to different surfaces of the base member by the energization path passing through the inside of the base member. In either case, there is no intention to interpret the shape of the base member in the present application to be limited to a specific shape.

In the bus component, one bus component and another bus component are configured to be able to be coupled such that the edges of the respective base members are in contact with each other. Then, in a state where one bus component is coupled to another bus component in this manner, the end of the first energization path in one bus component and the end of the first energization path in another bus component are connected to form a first power transmission path, and the end of the second energization path in one bus component and the end of the second energization path in another bus component are connected to form a second power transmission path. That is, as a result of coupling the one bus component and another bus component such that the one edge including the one end of each energization path in the one bus component and the other edge including the other end of each energization path in another bus component are in contact with each other, each energization path is connected to finally form the first power transmission path and the second power transmission path. In the formation of the first power transmission path and the second power transmission path, it is sufficient that the ends of the respective energization paths connected to the respective edges are in electrical contact with each other, and the edge of one bus component and the edge of another bus component need not be in contact with each other so as to completely coincide with each other over the entire region.

By sequentially coupling the bus components using the bus component configured as described above such that the edges of the bus components are in contact with each other, it is possible to form a power transmission path having a necessary length For example, the more devices that receive signals via a power transmission path, the more bus components may be coupled to ensure space for connection between the devices and the power transmission path. Although an energization path is formed in each of the coupled bus components, the energization paths in the respective bus components need not have the same shape. In order to form the necessary shapes and lengths of the first power transmission path and the second power transmission path, bus components with different energization paths formed therein may be combined and coupled appropriately.

Then, in the power transmission method of the present application, after the first power transmission path and the second power transmission path are disposed and formed in the first step, a predetermined process device is attached between the first power transmission path and the second power transmission path. That is, the attachment of the predetermined process device is performed later with reference to the placement of the first power transmission path and the second power transmission path. The predetermined process device is a device configured to be input to the device from the first power transmission path via the input terminal, perform a predetermined process on the signal in the device, and output the signal to the second power transmission path via the output terminal. An example of the predetermined process device can be a voltage conversion device (so-called converter). That is, in the power transmission method, the predetermined process device may be configured to perform a voltage conversion process as the predetermined process on a signal input to the input terminal, and in the third step, the voltage conversion process may be performed on the input signal, supplied to the first power transmission path, by the predetermined process device, and the voltage of the second power transmission path may be adjusted to a predetermined voltage using the output signal.

As another method of the predetermined process device, when a signal related to information (data) is transmitted to the first power transmission path, the predetermined process device is used as an amplification device (so-called amplifier device), so that the predetermined process device can be retrofitted to easily output an amplified signal to the second power transmission path. The predetermined process device is not limited to these examples, and the signal process content in the predetermined process device may be defined in consideration of the characteristic of the signal output to the second power transmission path.

In order to simplify the retrofitting of the predetermined process device to the first power transmission path and the second power transmission path, an electrical connection state is formed by employing a structure in which the input terminal and the output terminal of the device are in contact with the respective power transmission paths. For retrofitting the predetermined process device, it is preferable to use a known fixing technique (e.g., snap-type fixing method, screw fixing method, etc.) in order to stably maintain the contact of the input terminal and the output terminal with the respective power transmission paths.

Then, in the third step, a signal is input to the predetermined process device via the first power transmission path, and the signal subjected to the predetermined process in the device is output to the second power transmission path. As described above, in the power transmission method, by employing the configuration in which the predetermined process device is retrofitted to the first power transmission path and the second power transmission path, it is possible to increase the degree of freedom of the configuration of the entire power transmission path for transmitting a signal, and thereby to suitably transmit a signal for supplying power and a signal for transmitting information.

Further, in the power transmission method described above, in the first step, the first power transmission path and the second power transmission path may be disposed on the same plane, and in the second step, the predetermined process device may be attached so as to straddle the first power transmission path and the second power transmission path. Alternatively, in the first step, the first power transmission path and the second power transmission path are disposed on different planes, and in the second step, the predetermined process device is attached so as to be sandwiched between the first power transmission path and the second power transmission path. The form of attachment of the predetermined process device is not limited to these forms, and a form that can be retrofitted to the first power transmission path and the second power transmission path can be appropriately employed.

Further, in the power transmission method described above, the predetermined process device may include a first output terminal and a second output terminal having different output voltages, the second power transmission path may include two discontinuous power transmission paths, and when the predetermined process device is attached in the second step, the first output terminal may come into contact with one of the two discontinuous power transmission paths, and the second output terminal may come into contact with the other of the two discontinuous power transmission paths. By employing such a configuration, two types of signals having different electrical characteristics can be easily output to each of two discontinuous power transmission paths included in the second power transmission path by retrofitting a predetermined process device.

A signal for supplying power and a signal for transmitting information can be transmitted suitably.

DETAILED DESCRIPTION

Figure 1:
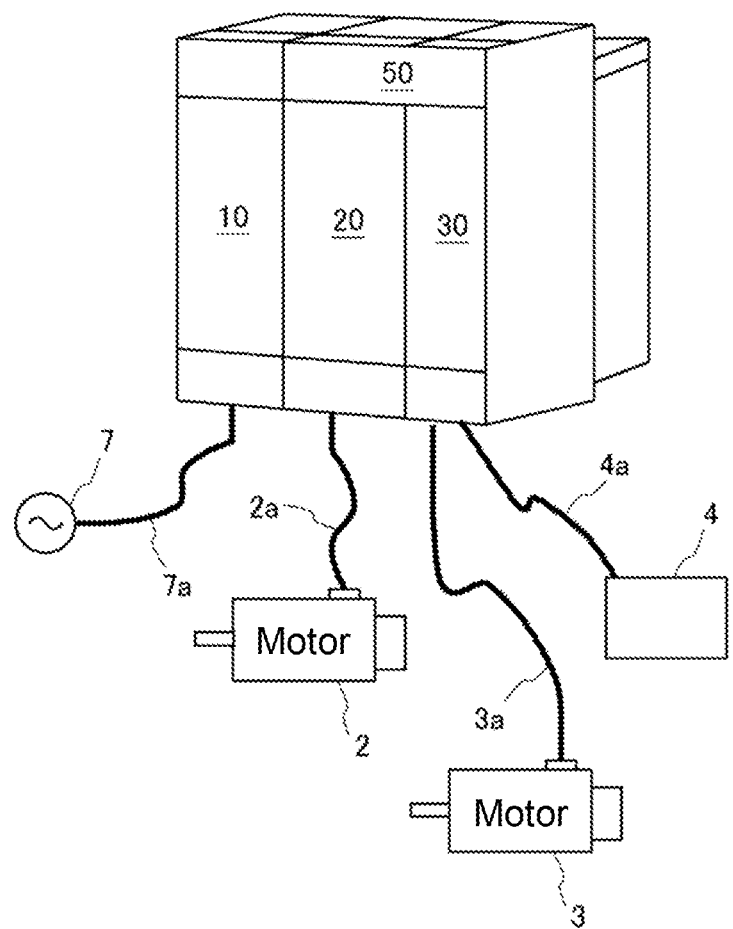
FIG. 1 is a diagram illustrating a schematic configuration of a power supply system.

Hereinafter, an embodiment of the present disclosure will be described in detail with reference to the drawings. Note that the same or corresponding parts in the drawings are denoted by the same reference numerals, and the description thereof will not be repeated. In the present disclosure, a driver that supplies drive power for driving a motor is shown as an exemplary form of a device including a power transmission path that transmits a signal, but the technical idea of the present disclosure can also be applied to devices other than the driver. In the driver, a signal related to power is transmitted via the power transmission path, that is, power supply (power feeding) is performed.

First Embodiment

FIG. 1 is a diagram illustrating a schematic configuration of a power supply system that supplies drive power to a motor and its peripheral devices (such as a relay device). The power supply system includes a converter 10, a driver 20, and a driver 30. The converter 10 receives the supply of alternating current (AC) power from an AC power supply 7 via a power line 7a and outputs DC power. The output DC power is supplied to the driver 20 and the driver 30 disposed adjacent to the converter 10 through a DC bus. The DC bus is a power transmission path through which a signal related to power is transmitted, and a detailed configuration thereof will be described later.

The driver 20 performs servo control of a motor 2 based on a command from a programmable logic controller (PLC) or the like (not illustrated). The controller of the driver 20 receives an operation command signal related to the operation (motion) of the motor 2 from the host device via the network and a detection signal from an encoder mounted on the motor 2, and calculates a command value related to the servo control for the drive of the motor 2. The driver 20 includes an inverter device therein, generates drive power for driving the motor 2 from the DC bus in accordance with the calculated command value, and supplies the drive power to the motor 2 via the power line 2a. The controller of the driver 20 is configured to control the motor 2 in addition to the servo control. For example, the motor 2 is driven and controlled by the driver 20 in order to drive predetermined equipment. As an example, various mechanical devices (e.g., an arm of an industrial robot or a conveyance device) can be exemplified as the equipment, and the motor 2 is incorporated in the device as an actuator that drives the equipment. The motor 2 is an AC servomotor. Alternatively, the motor 2 may be an induction motor or a DC motor. The motor 2 includes a detection disk that rotates in conjunction with rotation of each rotor and includes an encoder capable of detecting the rotation state of the rotor.

The driver 30 also basically includes an inverter device that receives power supply from the DC bus similarly to the driver 20, thereby generating drive power of the motor 3 and supplying the drive power to the motor 3 via a power line 3a. Furthermore, the driver 30 is configured to be able to supply drive power of a relay device 4, which is a drive device other than the motor 3, via a power line 4a. The relay device 4 is used for the purpose of performing a predetermined switching process or the like in the equipment in which the motors 2, 3 are incorporated, and the drive voltages of the inverter devices that generate the drive power of the motors 2, 3 are different from the drive voltage of the relay device 4. For example, the former drive voltages can be 350 V, and the latter drive voltage can be 24 V.

Figure 2:
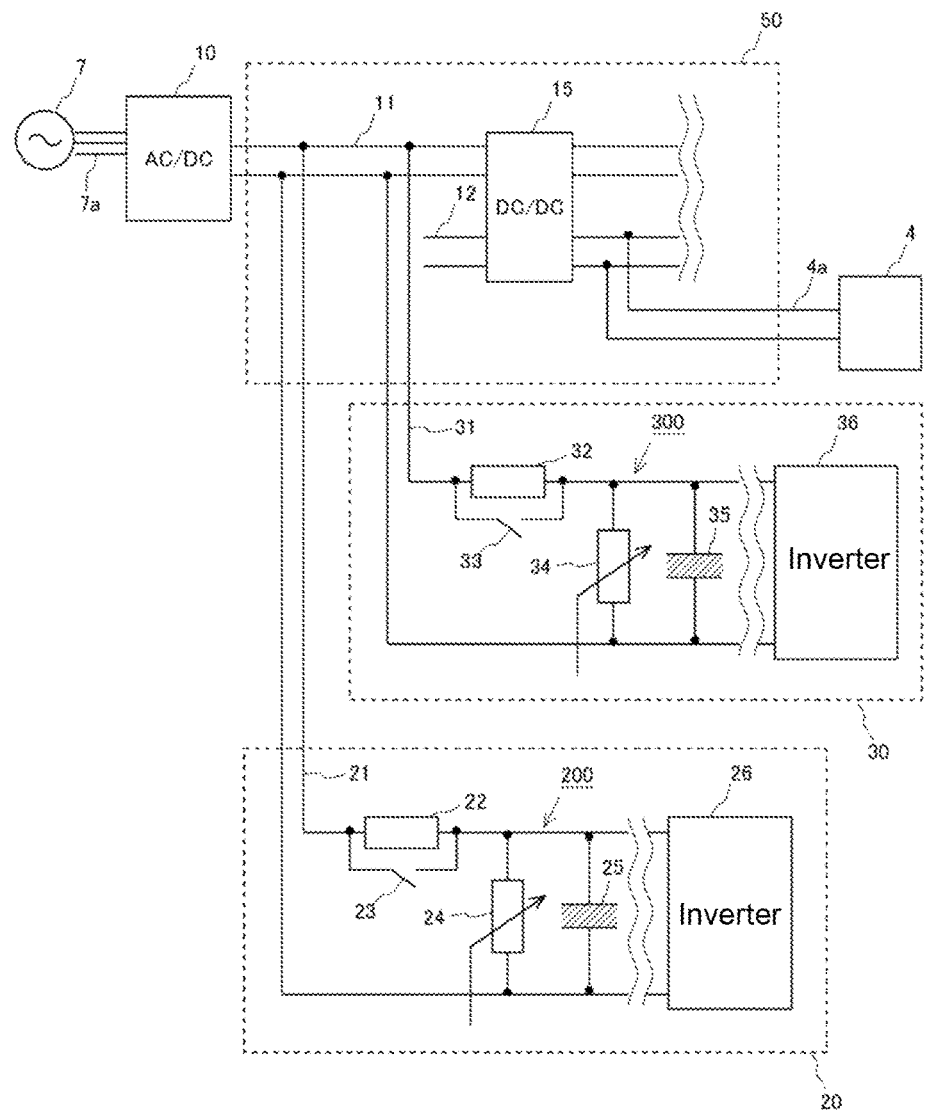
FIG. 2 is a diagram schematically illustrating a circuit configuration in the power supply system illustrated in FIG. 1.

Here, an electrical configuration of the power supply system illustrated in FIG. 1 will be described with reference to FIG. 2. In the power supply system, the power supplied from the AC power supply 7 via the power line 7a is converted into DC power by the converter 10 and output to a power transmission path 11 that is a DC bus. The voltage in the power transmission path 11 is, for example, 350 V. Reference numeral 50 in FIG. 2 denotes a configuration that includes the power transmission path 11 and outputs DC power to the driver 20 and the driver 30, and is referred to as a "DC bus device 50" in the present application. The length of the power transmission path 11 in the DC bus device 50 is appropriately adjusted in accordance with the number of drivers connected to the power supply system. For example, when the number of connected drivers increases, a bus component (cf. FIG. 3A etc.) to be described later is added to form the power transmission path 11 having an appropriate length.

Further, in the DC bus device 50, a DC-to-DC converter (hereinafter simply referred to as a "converter") 15, which receives the DC power of the power transmission path 11 and performs a predetermined voltage conversion process of converting the input voltage into a desired DC voltage, is disposed between the power transmission path 11 and a power transmission path 12. The converter 15 is configured to be attachable to the previously formed power transmission paths 11, 12 later, and details of this point will be described later. The output terminal of the converter 15 is connected to the power transmission path 12, and the output voltage converted by the converter 15 is applied to the power transmission path 12. In the embodiment, the output voltage of the converter 10 is 350 V, which is applied to the power transmission path 11 and input to the converter 15. Furthermore, the output voltage of the converter 15 is 24 V, which is applied to the power transmission path 12. The relay device 4 is connected to the power transmission path 12 via the power line 4a, and the voltage of the power transmission path 12 is applied to the relay device 4.

The driver 20 and the driver 30 are connected to the DC bus device 50 and are each supplied with the DC power of the power transmission path 11. Here, the configuration of the internal circuit of the driver 20, in particular, an input unit 200 to which DC power from the power transmission path 11 is input by connection with the DC bus device 50, will be described. The input unit 200 is a portion to which DC power from the outside is input in the driver 20, and the DC power input to the input unit 200 is supplied to an inverter 26 located on the downstream side. The inverter 26 itself is based on a known technique, and hence a detailed description thereof will be omitted.

In the input unit 200, a resistor 22 and a relay 23, which constitute a prevention circuit for preventing an inrush current from flowing from the power transmission path 11 of the DC bus device 50 into the input unit 200, are provided on a positive-side path of a power supply path 21. In the prevention circuit, the resistor 22 and the relay 23 are connected in parallel. In a state where the relay 23 is off, a current flowing through the positive-side path passes through the resistor 22, and in a state where the relay 23 is on, a current flows so as to bypass the resistor 22. More specifically, the relay 23 is in an off state at an initial timing when power is supplied from the DC bus device 50, and a current flows through the resistor 22 on the positive-side path, thereby reducing the peak value of the inrush current. Then, the relay 23 is turned on when a predetermined time has elapsed from the start of the power supply. This can avoid the resistor 22 from consuming power supplied from the DC bus device 50. Alternatively, a positive temperature coefficient (PTC) can be used instead of the resistor 22, and a semiconductor switch element can be used instead of the relay 23. The same applies to a resistor 22a and a relay 23a to be described later.

In addition, a capacitor 25 is disposed between the positive path and the negative path in the input unit 200. The capacitor 25 is disposed to hold the voltage fluctuation of the power supply path 21 within an allowable range. It is also possible to store regenerative power from the motor 2 driven by the driver 20. A discharge circuit 24 for discharging the power stored in the capacitor 25 is connected between the positive-side path and the negative-side path of the power supply path 21. The discharge circuit 24 includes a resistor for power consumption and a switch circuit for control of voltage application to the resistor, but the configuration itself is based on a known technique, and hence a detailed description thereof will be omitted.

Furthermore, the driver 30 also includes an input unit 300 having a configuration substantially similar to that of the driver 20, in which a prevention circuit having a resistor 32 and a relay 33, a discharge circuit 34, and a capacitor 35 are provided on a positive-side path of a power supply path 31. The connection method of the prior art can be appropriately employed for the connection of each of the power supply path 21 of the driver 20 and the power supply path 31 of the driver 30 to the power transmission path 11 of the DC bus device 50. The driver 30 includes an inverter 36.

Next, the construction of the power transmission path 11 and the power transmission path 12 in the DC bus device 50 will be described with reference to FIGS. 3A to 3I and FIGS. 4A to 4D. FIGS. 3A to 3I each illustrate a schematic configuration of a power transmission path in the DC bus device, that is, a bus component forming the DC bus, and FIGS. 4A to 4D illustrate a schematic configuration of a power transmission path formed by connecting the bus components illustrated in the respective drawings. First, the bus component will be described.

<First Form>

Figure 3A:
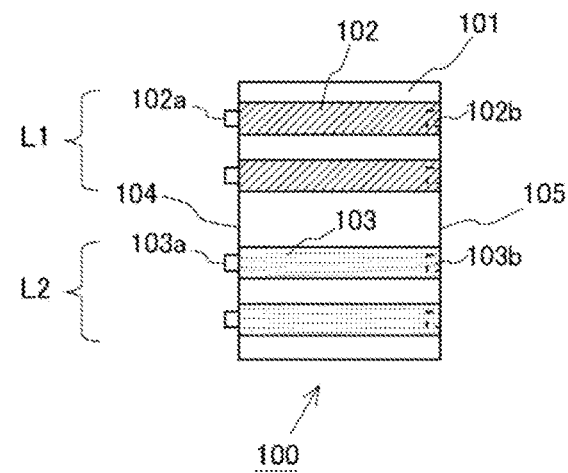
FIG. 3A is a first diagram illustrating a schematic configuration of a bus component forming a direct current (DC) bus.

A bus component 100 according to a first form will be described with reference to FIG. 3A. The bus component 100 illustrated in FIG. 3A is a component configured to form the power transmission path 11 and the power transmission path 12 in the DC bus device 50 by being coupled to another bus component 100. The bus component 100 includes a base member 101 having a substantially rectangular shape in a front view illustrated in FIG. 3A, and edges 104, 105 corresponding to the left and right sides of the base member 101 correspond to edges that come into contact when the bus components 100 are coupled to each other. That is, the bus components 100 are coupled such that the left edge 104 of another bus component 100 is in contact with the right edge of one bus component 100, and the coupling is repeated any number of times, whereby the power transmission paths 11, 12 having a desired length can be formed.

Specifically, the base member 101 is formed of an insulating member, and a pair of energization paths 102 and a pair of energization paths 103, which are each formed of a linear metal member so as to be partially exposed on the surface of the base member 101, are embedded. In a first region L1 of the upper half of the base member 101, two energization paths 102 extending from the edge 104 to the edge 105 are disposed. In a second region L2 of the lower half of the base member 101, two energization paths 103 extending from the edge 104 to the edge 105 are disposed. The energization paths 102, 103 are parallel to each other, the respective ends thereof are exposed at the edge 104, and the respective ends thereof are also exposed at the edge 105. Protrusions 102a, 103a are provided near the ends on the edge 104 side of the respective energization paths 102, 103, and recesses 102b, 103b are provided near the ends on the edge 105 side of the respective energization paths 102, 103. The sizes of the recesses 102b, 103b are such that the protrusions 102a, 103a are fitted suitably.

Therefore, when the two bus components 100 are coupled, the protrusions 102a, 103a of the one bus component 100 are fitted into the recesses 102b, 103b of another bus component 100, so that the one edge 104 comes into contact with the other edge 105. Thus, the respective ends of the energization paths 102, 103 in the one bus component 100 come into contact with the respective ends of the energization paths 102, 103 in another bus component 100, forming an electrically continuous energization path, that is, a power transmission path (a DC bus or a part of the DC bus). By sequentially coupling the bus components 100, the length of the power transmission path can be arbitrarily adjusted by the continuous energization paths 102, 103. In addition, a known fixing method (snap-type or screw-type fixing method) can be employed to stably maintain the coupling state of the two bus components.

Regarding the coupling of the bus components 100, the same type of bus components need not necessarily be coupled, and the coupling may be performed by appropriately combining the bus components 100 to be described later in FIGS. 3B to 3I and bus components that are not disclosed in the present application but can be conceived by a person skilled in the art based on the present disclosure so as to finally realize the necessary shape and size of the power transmission path.

<Second Form>

Figure 3B:
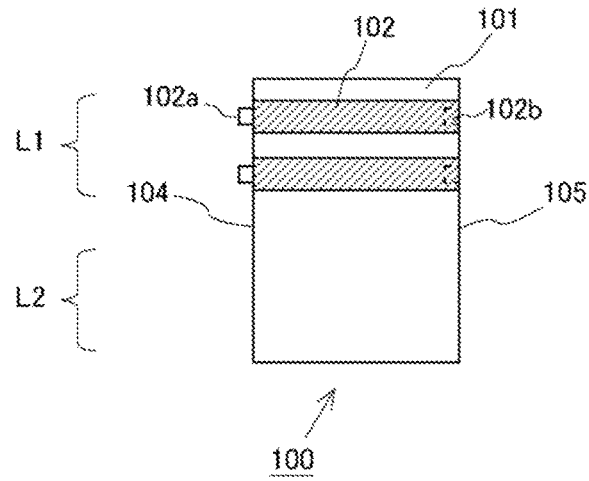
FIG. 3B is a second diagram illustrating a schematic configuration of the bus component forming the DC bus.

A bus component 100 according to a second form will be described with reference to FIG. 3B. Since the display mode of the bus component 100 in FIG. 3B is the same as the display mode of the bus component 100 in FIG. 3A and the like described above, elements having substantially the same configuration are denoted by the same reference numerals, and a detailed description thereof will be omitted.

Specifically, in the present form, the pair of energization paths 102 extending from the edge 104 to the edge 105 are disposed in the first region L1 of the upper half of the base member 101, but the energization path 103 is not formed in the second region L2 of the lower half of the base member 101. That is, when the bus component 100 of the present form is coupled to another bus component, the energization path can be extended only on the first region L1 side of the upper half of the base member 101.

<Third Form>

Figure 3C:
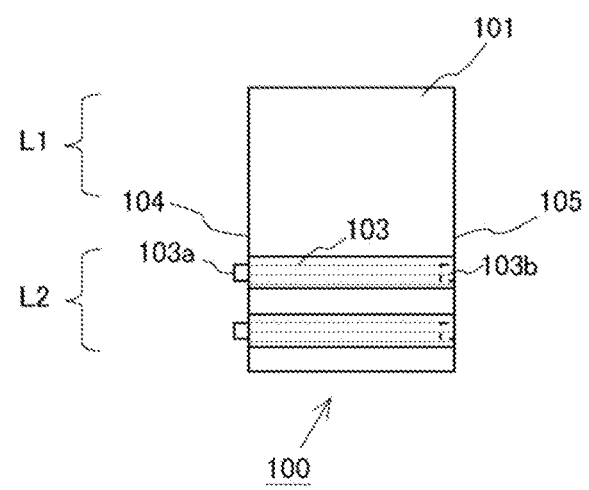
FIG. 3C is a third diagram illustrating a schematic configuration of the bus component forming the DC bus.

A bus component 100 according to a third form will be described with reference to FIG. 3C. Since the display mode of the bus component 100 in FIG. 3C is the same as the display mode of the bus component 100 in FIG. 3A and the like described above, elements having substantially the same configuration are denoted by the same reference numerals, and a detailed description thereof will be omitted.

Specifically, in the present form, the pair of energization paths 103 extending from the edge 104 to the edge 105 are disposed in the second region L2 of the lower half of the base member 101, but the energization path 102 is not formed in the first region L1 of the upper half of the base member 101. That is, when the bus component 100 of the present form is coupled to another bus component, the energization path can be extended only on the second region L2 side of the lower half of the base member 101.

<Fourth Form>

Figure 3D:
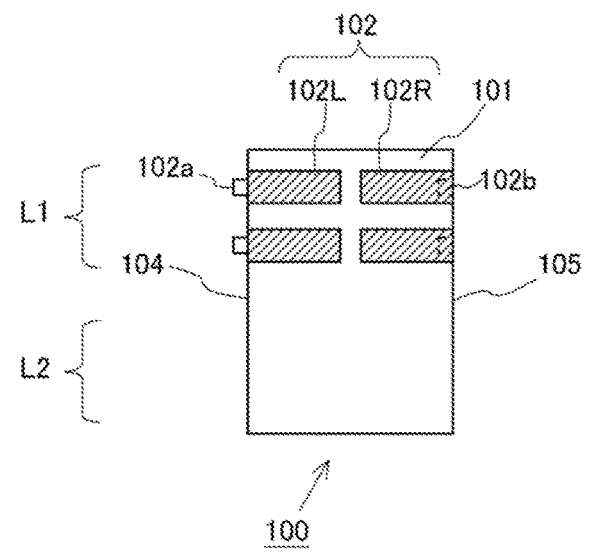
FIG. 3D is a fourth diagram illustrating a schematic configuration of the bus component forming the DC bus.

A bus component 100 according to a fourth form will be described with reference to FIG. 3D. Since the display mode of the bus component 100 in FIG. 3D is the same as the display mode of the bus component 100 in FIG. 3A and the like described above, elements having substantially the same configuration are denoted by the same reference numerals, and a detailed description thereof will be omitted.

Specifically, the present form is a modification of the form illustrated in FIG. 3B. That is, in the form where the energization path 103 is not formed in the second region L2, and the pair of energization paths 102 are formed in the first region L1 in the base member 101, the energization path 102 is divided at the center in the width direction (the left-right direction in the drawing is the width direction) of the base member 101, and a right-side energization path 102R and a left-side energization path 102L are formed. Thus, the right-side energization path 102R and the left-side energization path 102L are not directly electrically connected. Alternatively, in the form where the energization path is not formed in the first region L1, and the energization path 103 is formed in the second region L2 in the base member 101, the energization path 103 may be divided at the center in the width direction of the base member 101, and a right-side energization path and a left-side energization path may be formed.

<Fifth Form>

Figure 3E:
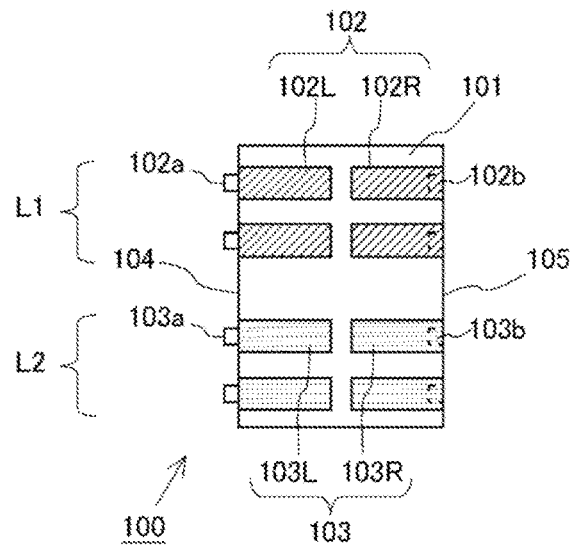
FIG. 3E is a fifth diagram illustrating a schematic configuration of the bus component forming the DC bus.

A bus component 100 of a fifth form will be described with reference to FIG. 3E. Since the display mode of the bus component 100 in FIG. 3E is the same as the display mode of the bus component 100 in FIG. 3A and the like described above, elements having substantially the same configuration are denoted by the same reference numerals, and a detailed description thereof will be omitted.

Specifically, the present form is a modification of the form illustrated in FIG. 3A. That is, in the form where the pair of energization paths 102 is formed in the first region L1 and the pair of energization paths 103 is formed in the second region L2 in the base member 101, the energization path 102 is divided at the center in the width direction of the base member 101, the right-side energization path 102R and the left-side energization path 102L are formed, the energization path 103 is divided at the center in the width direction of the base member 101, and the right-side energization path 103R and the left-side energization path 103L are formed. Therefore, the right-side energization path 102R and the left-side energization path 102L are not directly electrically connected, and the right-side energization path 103R and the left-side energization path 103L are not directly electrically connected.

<Sixth Form>

Figure 3F:
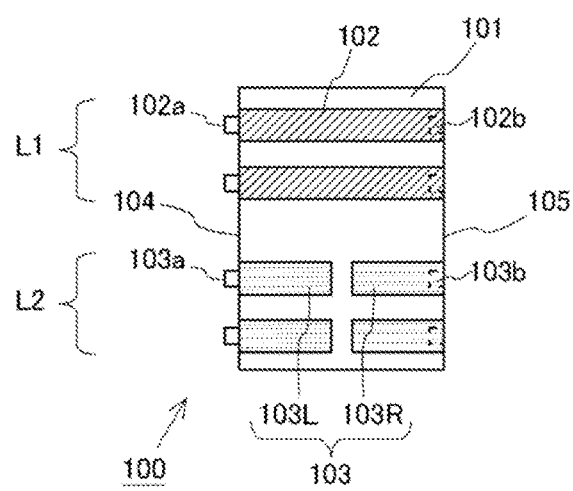
FIG. 3F is a sixth diagram illustrating a schematic configuration of the bus component forming the DC bus.

A bus component 100 according to a sixth form will be described with reference to FIG. 3F. Since the display mode of the bus component 100 in FIG. 3F is the same as the display mode of the bus component 100 in FIG. 3A and the like described above, elements having substantially the same configuration are denoted by the same reference numerals, and a detailed description thereof will be omitted.

Specifically, the present form is a modification of the form illustrated in FIG. 3A. That is, in the form where the pair of energization paths 102 are formed in the first region L1, and the pair of energization paths 103 are formed in the second region L2 in the base member 101, the energization path 103 is divided at the center in the width direction of the base member 101, and a right-side energization path 103R and a left-side energization path 103L are formed. Therefore, the right-side energization path 103R and the left-side energization path 103L are not directly electrically connected. Alternatively, in the form where the energization path 102 is formed in the first region L1, and the energization path 103 is formed in the second region L2 in the base member 101, the energization path 102 may be divided at the center in the width direction of the base member 101, and a right-side energization path and a left-side energization path may be formed.

<Seventh Form>

Figure 3G:
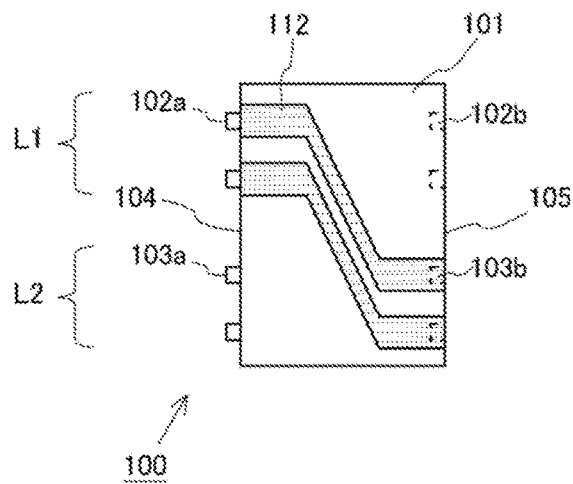
FIG. 3G is a seventh diagram illustrating a schematic configuration of the bus component forming the DC bus.

A bus component 100 according to a seventh form will be described with reference to FIG. 3G. Since the display mode of the bus component 100 in FIG. 3G is the same as the display mode of the bus component 100 in FIG. 3A and the like described above, elements having substantially the same configuration are denoted by the same reference numerals, and a detailed description thereof will be omitted.

Specifically, in the present form, a pair of energization paths 112 are formed so as to straddle the first region L1 and the second region L2 in the base member 101. That is, the energization path 112 is a path connecting the left side of the first region L1 and the right side of the second region L2 in the base member 101 and is for switching between energization in the first region L1 and energization on the second region L2 side. Alternatively, the energization path 112 may be formed so as to connect the right side of the first region L1 and the left side of the second region in the base member 101.

<Eighth Form>

Figure 3H:
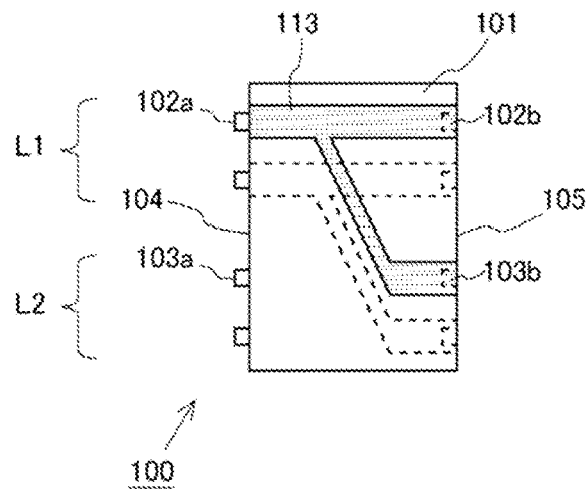
FIG. 3H is an eighth diagram illustrating a schematic configuration of the bus component forming the DC bus.

A bus component 100 of an eighth form will be described with reference to FIG. 3H. Since the display mode of the bus component 100 in FIG. 3H is the same as the display mode of the bus component 100 in FIG. 3A and the like described above, elements having substantially the same configuration are denoted by the same reference numerals, and a detailed description thereof will be omitted.

Specifically, in the present form, a pair of energization paths 113 are formed in the base member 101. The energization path 113 is formed such that with reference to the edge 104 of the base member 101, an energization path extending from the edge 104 toward the edge 105 branches into the first region L1 side and the second region L2 side in the middle of the width direction of the base member 101. In FIG. 3H, one of the pair of energization paths 113 is indicated by a broken line to make the drawing easier to understand. Alternatively, the energization path 113 may be formed such that with reference to the edge 104 of the base member 101, an energization path extending from the edge 105 toward the edge 105 branches into the first region L1 side and the second region L2 side in the middle of the width direction of the base member 101.

<Ninth Form>

Figure 3I:
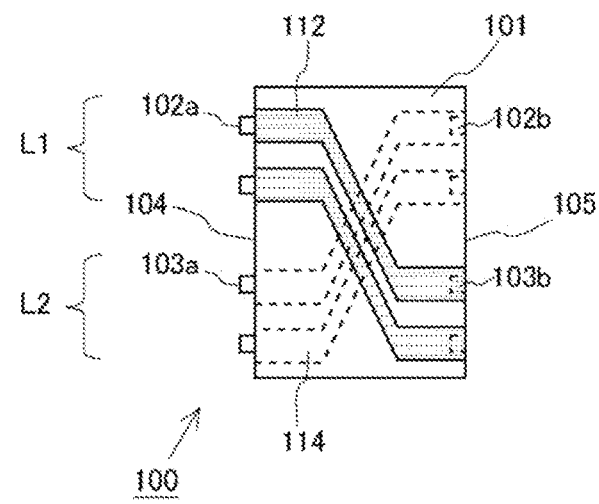
FIG. 3I is a ninth diagram illustrating a schematic configuration of the bus component forming the DC bus.

A bus component 100 according to a ninth form will be described with reference to FIG. 3I. Since the display mode of the bus component 100 in FIG. is the same as the display mode of the bus component 100 in FIG. 3A and the like described above, elements having substantially the same configuration are denoted by the same reference numerals, and a detailed description thereof will be omitted.

Specifically, in the present form, a pair of energization paths 112 (cf. FIG. 3G) and a pair of energization paths 114 are formed in the base member 101. As described in the eighth form, the energization path 114 is an energization path formed to connect the right side of the first region L1 and the left side of the second region in the base member 101. In the present form as well, the pair of energization paths 114 are indicated by broken lines to make the drawing easier to understand.

<Formation of Power Transmission Path>

Figure 4A:
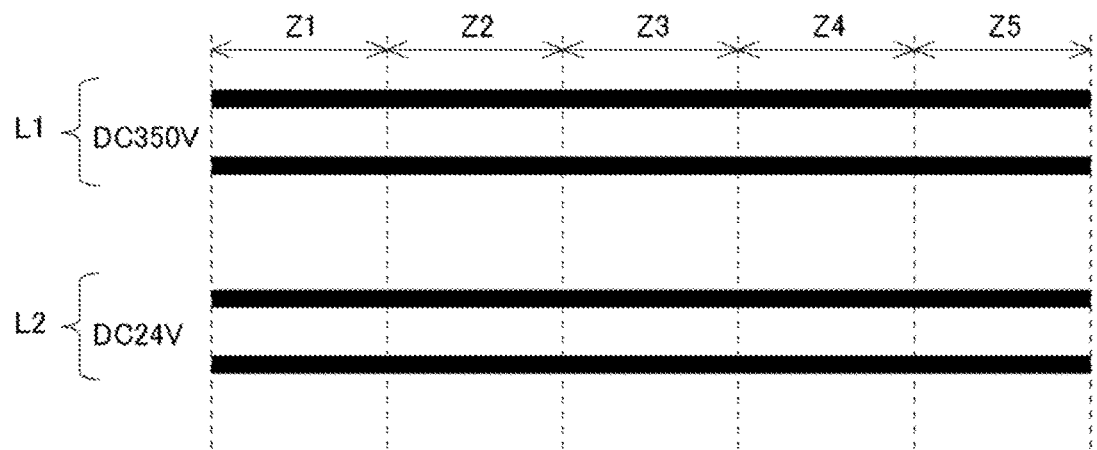
FIG. 4A is a first diagram illustrating a schematic configuration of a DC bus formed of bus components.

Next, the formation of a power transmission path using the bus components illustrated in FIGS. 3A to 3I will be described with reference to FIGS. 4A to 4D. FIG. 4A illustrates two types of power transmission paths to which different DC voltages are applied. For example, as in the DC bus device 50 in FIG. 2, a power transmission path to which a high voltage (e.g., 350 V) is applied is disposed on the upper side, and a power transmission path to which a low voltage (e.g., 24 V) is applied is disposed on the lower side. In order to form such a power transmission path, the bus components 100 illustrated in FIG. 3A are coupled continuously. In the form illustrated in FIG. 4A, by coupling five bus components illustrated in FIG. 3A corresponding to respective regions Z1 to Z5, the energization paths 102, 103 of the bus components 100 are electrically continuous, and finally, one continuous power transmission path can be formed as illustrated in FIG. 4A. When it is desired to adjust the length of the power transmission path, it is sufficient that the number of bus components 100 to be coupled is adjusted.

Figure 4B:
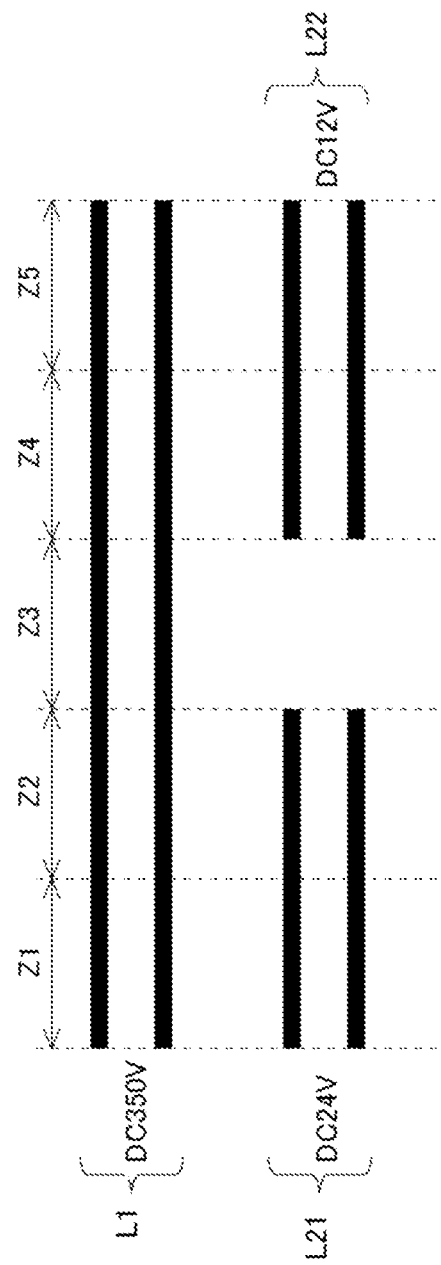
FIG. 4B is a second diagram illustrating a schematic configuration of the DC bus formed by the bus components.

Next, in FIG. 4B, power transmission paths are formed on the upper side and the lower side as in FIG. 4A, but each of the power transmission paths on the lower side is divided into a left region L21 and a right region L22. For example, a power transmission path to which a high voltage (e.g., 350 V) is applied can be disposed in an upper region L1, a power transmission path to which a low voltage (e.g., 24 V) is applied can be disposed in the lower and left region L21, and a power transmission path to which a lower voltage (e.g., 12 V) is applied can be disposed in the lower and right region L22. The voltages applied to the left region L21 and the right region L22 may be the same. An advantage of such power transmission paths is that a plurality of types of power supply voltages can be compactly prepared, and drive power can be easily supplied to a drive device such as a motor. In order to form the power transmission paths of such shapes, the bus component 100 illustrated in FIG. 3A is prepared as the bus component 100 corresponding to each of the regions Z1 to Z2 and Z4 to Z5, and the bus component 100 illustrated in FIG. 3B is further prepared as the bus component 100 corresponding to the region Z3. Then, when the bus components 100 are coupled in the order of the regions, the energization paths 102, 103 of the bus components are electrically coupled to form the power transmission paths illustrated in FIG. 4B.

Figure 4C:
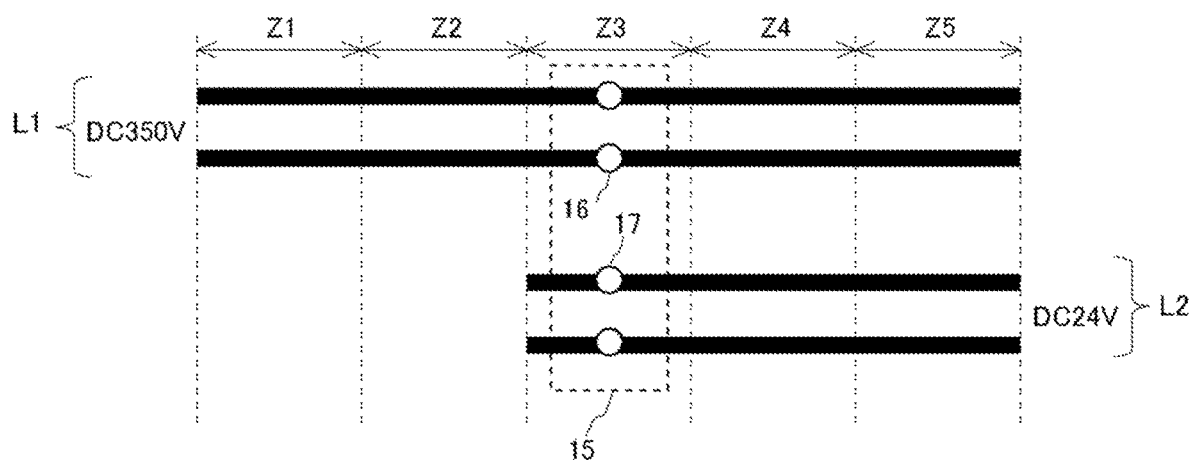
FIG. 4C is a third diagram illustrating a schematic configuration of the DC bus formed by the bus components.

Next, in FIG. 4C, the power transmission paths are formed on the upper side and the lower side as in FIG. 4B, but the power transmission path is formed over the regions Z1 to Z5 in the power transmission path in the upper region L1, and the power transmission path is not formed in the regions Z1 and Z2 but is formed in the regions Z3 to Z5 in the power transmission path in the lower region L2. The power transmission paths substantially coincide with the power transmission paths 11, 12 illustrated in FIG. 2. That is, the power transmission path in the first region L1 corresponds to the power transmission path 11, and the power transmission path in the second region L2 corresponds to the power transmission path 12. Here, a method for forming the power transmission paths of such shapes will be described with reference to a flowchart illustrated in FIG. 5. First, in S101, the bus component 100 illustrated in FIG. 3B is prepared as the bus component 100 corresponding to each of the regions Z1 to Z2, and the bus component 100 illustrated in FIG. 3A is further prepared as the bus component 100 corresponding to each of the regions Z3 to Z5. Then, the bus components 100 may be coupled in the order of the regions. At this time, the bus components 100 are arranged on a plane such that the edges 104, 105 of adjacent components are in contact with each other.

Then, in S102, the converter (voltage conversion device) 15 is attached to the power transmission path constructed in S101. As described above, the converter 15 is a DC-to-DC converter, and the power transmission path in the first region L1 is an input side, and the power transmission path in the second region L2 is an output side. That is, the converter 15 performs a voltage conversion process of converting the applied voltage (e.g., 350 V) of the power transmission path in the first region L1 into a desired voltage (e.g., 24 V) and applies the voltage to the power transmission path in the second region L2. At this time, in S102, the converter 15 is attached so as to straddle the power transmission path in the first region L1 and the power transmission path in the second region L2 formed in S101 such that an input-side terminal 16 of the converter 15 is in contact with the power transmission path in the first region L1 and an output-side terminal 17 is in contact with the power transmission path in the second region L2. This enables input to the converter 15 and output from the converter 15. For retrofitting the predetermined process device, it is preferable to use a known fixing technique (e.g., snap-type fixing method, screw fixing method, etc.) in order to stably maintain the contact of the input terminal and the output terminal with the respective power transmission paths.

Then, in S103, for example, the converter 10 is driven to supply power to the power transmission path in the first region L1, and the applied voltage is set to 350 V. Then, the power after the voltage conversion to 24 V is output to the power transmission path in the second region L2 by the voltage conversion process of converter 15. Thereby, the applied voltage of the power transmission path on the second region L2 side can be set to 24 V. The power transmission path is connected to, for example, the relay device 4 illustrated in FIGS. 1 and 2 and can suitably supply power to the relay device 4.

Figure 5:
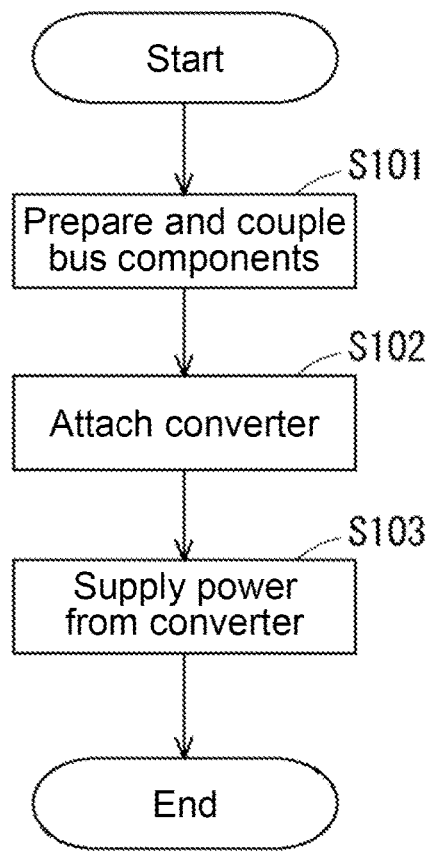
FIG. 5 is a flowchart illustrating a flow of process of a method for forming a DC bus using bus components.

By constructing the power transmission path by the method illustrated in FIG. 5 and attaching the converter 15 after the construction of the power transmission path as described above, it is possible to easily bring the power transmission path in the second region L2 into a state where a desired voltage is applied. The converter 15 is, so to speak, retrofitted to the power transmission path, so that the mounting position and the like can be relatively adjusted. The power transmission path itself can also be adjusted to any length and shape by combining (coupling) the bus components 100, and further, the position of the converter 15 can also be adjusted with a high degree of freedom, so that the DC bus device 50 can be easily formed, user convenience is improved, and the DC bus device 50 can be made compact.

Figure 4D:
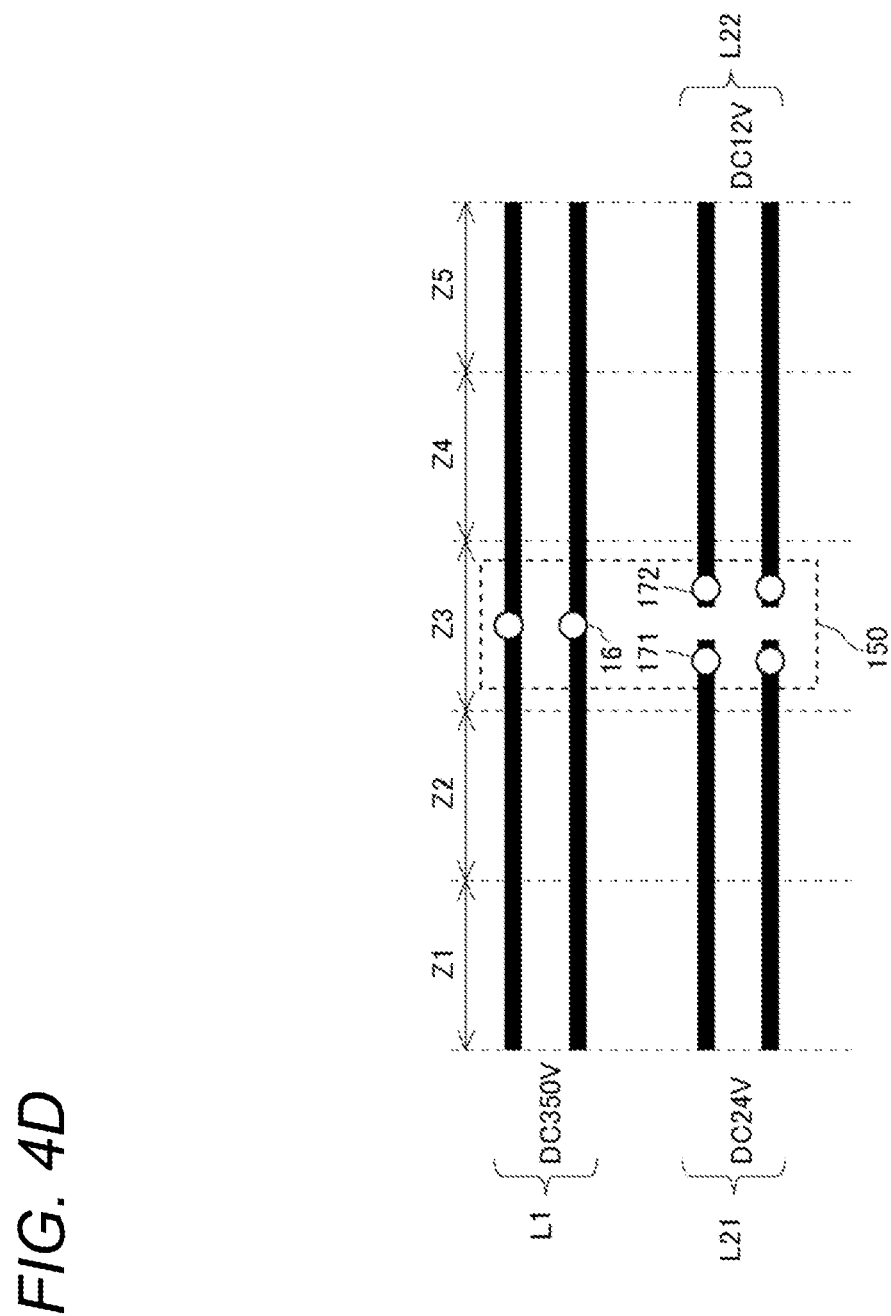
FIG. 4D is a fourth diagram illustrating a schematic configuration of the DC bus formed by the bus components.

Next, in FIG. 4D, as in FIG. 4B, the power transmission paths are formed on the upper side and the lower side, respectively, but for the power transmission path on the lower side, a divided power transmission path is formed in the region Z3. In order to form the power transmission paths of such shapes, the bus component 100 illustrated in FIG. 3A is prepared as the bus component 100 corresponding to each of the regions Z1 to Z2 and Z4 to Z5, and the bus component 100 illustrated in FIG. 3F is further prepared as the bus component 100 corresponding to the region Z3. Then, when the bus components 100 are coupled in the order of the regions, the energization paths 102, 103 of the bus components are electrically coupled to form the power transmission paths illustrated in FIG. 4D. In the power transmission paths of FIG. 4D, in particular, the power transmission paths in the lower second regions L21, L22 are electrically discontinuous between the regions Z1 to Z2 and the regions Z4 to Z5.

To such power transmission paths, a converter 150 is retrofitted to the position of the region Z3. Similarly to the converter 15, the converter 150 is a DC-to-DC converter, and the terminal 16 on the input side is in contact with the power transmission path in the first region L1. The converter 150 includes two voltage conversion circuits therein and is configured to be able to convert a voltage input from the terminal 16 into two different voltages (e.g., 24 V and 12 V) and output the two different voltages. Of two terminals on the output side of the converter 150, a terminal 171 is in contact with the power transmission path on the left region L21 (mainly corresponding to the regions Z1 and Z2) in the second region, and the remaining terminal 172 is in contact with the power transmission path on the right region L22 in the second region (mainly corresponding to the regions Z4 and Z5). Note that the retrofitting of the converter 150 is as described with reference to FIGS. 4C and 5.

By employing such a configuration, the applied voltage of the power transmission path in the region L21 can be set to 24 V, and the applied voltage of the power transmission path in the region L22 can be set to 12 V by the retrofitting operation of the converter 150, thus facilitating the construction of the power transmission paths having different voltages.

<Modification of Formation of Power Transmission Path>

Figure 6:
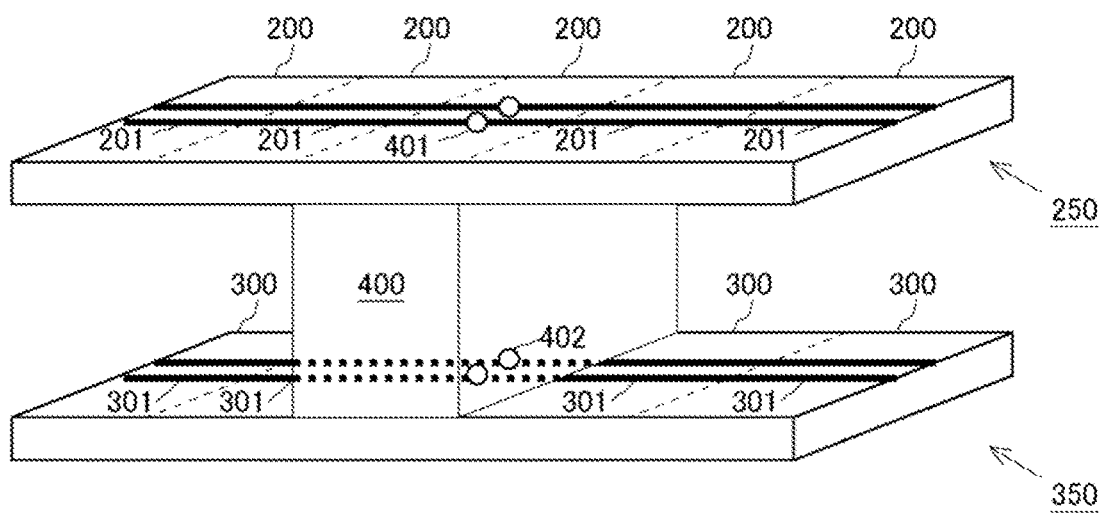
FIG. 6 is a fifth diagram illustrating a schematic configuration of the DC bus formed by the bus components.

Next, a modification of the formation of the power transmission path using the bus components illustrated in FIGS. 3A to 3I will be described with reference to FIG. 6. In the form illustrated in FIG. 6, bus components are denoted by reference numerals 200 and 300. An energization path 201 is formed in the bus component 200. The configurations of the bus component and the energization path 201 conform to the configurations illustrated in FIG. 3A and the like. Adjacent bus components 200 are coupled such that the edges thereof are in contact with each other, whereby an upper power transmission path 250 is formed by the continuous energization paths 201. Similarly, an energization path 301 is formed in a bus component 300, and the adjacent bus components 300 are coupled such that the edges thereof are in contact with each other, whereby a lower power transmission path 350 is formed by the continuous energization paths 301. In the form illustrated in FIG. 6, five bus components 200, 300 are arranged in a line on a plane.

Then, a converter 400 is retrofitted so as to be sandwiched between the upper power transmission path 250 and the lower power transmission path 350. Similarly to the converter 15, the converter 400 is a DC-to-DC converter, and an input terminal 401 thereof is in contact with the upper power transmission path 250. Similarly to the converter 15, the converter 400 includes one voltage conversion circuit therein and is configured to be able to output the voltage input from the terminal 401 to a terminal 402. The output-side terminal of the converter 400 is in contact with the lower power transmission path 350. Note that the retrofitting of the converter 450 is as described with reference to FIGS. 4C and 5.

For example, when a voltage of 350 V is applied to the upper power transmission path 250 by the converter 10 or the like, and the converter 400 is configured to be capable of executing a voltage conversion process from 350 V to 24 V, a voltage of 24 V is applied to the lower power transmission path 350. In this way, by retrofitting the converter 400 between the two power transmission paths, the DC bus device can be three-dimensionally constructed as compared with the forms illustrated in FIGS. 4C and 4D.

Further Modification

In the embodiment described above, the power transmission path is formed as a path for transmitting a signal related to electric power, but instead of the embodiment, the power transmission path may be formed as a path for transmitting a signal related to information (data). Even in such a case, a power transmission path for information transmission having a desired length and shape can be formed by coupling the bus components and the like illustrated in FIGS. 3A to 3I. In such a power transmission path for information transmission, an amplifier device or the like that performs a predetermined process (e.g., signal amplification process, etc.) on a transmitted signal may be attached to the power transmission path later, instead of the converter 15 or the like.

<Appendix 1>

A method for transmitting a signal to a power transmission path, the method including:
  a first step (S101) of disposing a first power transmission path (11) and a second power transmission path (12);
  a second step (S102) of attaching a predetermined process device (15), being detachable, between the first power transmission path (11) and the second power transmission path (12) such that an input terminal (16) of the predetermined process device (15) is in contact with the first power transmission path (11) and that an output terminal (17) of the predetermined process device (15) is in contact with the second power transmission path (12); and
  a third step (S103) of supplying an input signal to the first power transmission path (11) and outputting, to the second power transmission path (12), an output signal obtained by the predetermined process device (15) performing a predetermined process on the input signal.

The invention claimed is:

1. A method for transmitting a signal to a power transmission path, the method comprising:
   a first step of disposing a first power transmission path and a second power transmission path;
   a second step of adjusting a mounting position of a predetermined process device, being detachable, after a construction of the first power transmission path and the second power transmission path and then attaching the predetermined process device between the first power transmission path and the second power transmission path such that an input terminal of the predetermined process device is in contact with the first power transmission path and that an output terminal of the predetermined process device is in contact with the second power transmission path; and
   a third step of supplying an input signal to the first power transmission path and outputting, to the second power transmission path, an output signal obtained by performing a predetermined process on the input signal by the predetermined process device.

2. The method of power transmission according to claim 1, wherein
   the predetermined process device is configured to perform a voltage conversion process as the predetermined process, and
   in the third step, the voltage conversion process is performed on the input signal, supplied to the first power transmission path, by the predetermined process device, and the voltage of the second power transmission path is adjusted to a predetermined voltage using the output signal.

3. The method of power transmission according to claim 1, wherein
   in the first step, the first power transmission path and the second power transmission path are disposed on the same plane, and
   in the second step, the predetermined process device is attached so as to straddle the first power transmission path and the second power transmission path.

4. The method of power transmission according to claim 1, wherein
   in the first step, the first power transmission path and the second power transmission path are disposed on different planes, and
   in the second step, the predetermined process device is attached so as to be sandwiched between the first power transmission path and the second power transmission path.

5. The method of power transmission according to claim 1, wherein
   the predetermined process device includes a first output terminal and a second output terminal having different output voltages,
   the second power transmission path includes two discontinuous power transmission paths, and
   when the predetermined process device is attached in the second step, the first output terminal comes into contact with one of the two discontinuous power transmission paths, and the second output terminal comes into contact with the other of the two discontinuous power transmission paths.

6. The method of power transmission according to claim 1, wherein
   in the first step, a plurality of bus components are prepared, each of the plurality of the bus components including a base member, and a first energization path and a second energization path that are formed to extend from one edge to the other edge of a set of opposing edges of the base member, and
   an edge of one of the bus components is brought into contact with an edge of another of the bus components to couple the one of the bus components and the another of the bus components to each other, and the first energization path and the second energization path in the one of the bus components and the first energization path and the second energization path in the another of the bus components are connected to form the first power transmission path and the second power transmission path.

7. A method for transmitting a signal to a power transmission path, the method comprising:
   a first step of disposing a first power transmission path and a second power transmission path;
   a second step of attaching a predetermined process device, being detachable, between the first power transmission path and the second power transmission path such that an input terminal of the predetermined process device is in contact with the first power transmission path and that an output terminal of the predetermined process device is in contact with the second power transmission path; and
   a third step of supplying an input signal to the first power transmission path and outputting, to the second power transmission path, an output signal obtained by performing a predetermined process on the input signal by the predetermined process device, wherein
   the predetermined process device includes a first output terminal and a second output terminal having different output voltages,
   the second power transmission path includes two discontinuous power transmission paths, and
   when the predetermined process device is attached in the second step, the first output terminal comes into contact with one of the two discontinuous power transmission paths, and the second output terminal comes into contact with the other of the two discontinuous power transmission paths.

* * * * *